(12) United States Patent
Kogure et al.

(10) Patent No.: US 6,678,460 B1
(45) Date of Patent: Jan. 13, 2004

(54) MAGNETIC REPRODUCER AND MAGNETIC REPRODUCTION METHOD

(75) Inventors: Isao Kogure, Tokyo (JP); Yasutaka Kotani, Tokyo (JP); Kazuyuki Iesaka, Tokyo (JP); Masanori Kimura, Aichi (JP); Keiko Takeda, Kanagawa (JP); Hisao Osabe, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/460,866

(22) Filed: Dec. 14, 1999

(30) Foreign Application Priority Data

Dec. 16, 1998 (JP) ............................. 10-357737

(51) Int. Cl.$^7$ ................................. H04N 5/91
(52) U.S. Cl. ......................... 386/46; 386/124
(58) Field of Search ................... 386/46, 124, 95, 386/117, 123; H04N 5/91

(56) References Cited

U.S. PATENT DOCUMENTS

| | | | | |
|---|---|---|---|---|
| 5,335,125 A | * | 8/1994 | Nakatsu et al. | 386/67 |
| 5,504,632 A | * | 4/1996 | Kita et al. | 386/96 |
| 5,548,410 A | * | 8/1996 | Kim et al. | 386/104 |
| 5,757,569 A | * | 5/1998 | Ohishi et al. | 360/64 |
| 5,808,750 A | * | 9/1998 | Yang et al. | 386/84 |
| 5,903,704 A | * | 5/1999 | Owashi et al. | 386/95 |
| 6,104,862 A | * | 8/2000 | Amada et al. | 386/103 |
| 6,272,285 B1 | * | 8/2001 | Abe et al. | 386/124 |

\* cited by examiner

*Primary Examiner*—Vincent Boccio
(74) *Attorney, Agent, or Firm*—Frommer Lawrence & Haug LLP; William S. Frommer

(57) ABSTRACT

A magnetic reproducer for reproducing data recorded on a magnetic tape by forming tracks sequentially and obliquely along a longitudinal direction of the magnetic tape, has magnetic heads for reproducing the information by sequentially scanning the tracks formed on the magnetic tape with a first track width for a first recording system or a second track width for a second recording system wider than that for the first recording system. And, a gap width between the magnetic heads is set at a value which is wider than the first track width and narrower than the second track width.

8 Claims, 9 Drawing Sheets

| ITEM | DIGITAL 8mm SYSTEM | | ANALOG 8mm SYSTEM | | DV SYSTEM | |
|---|---|---|---|---|---|---|
| MODE | SP | LP | SP | LP | SP | LP |
| DIAMETER OF DRUM mm | 40 | | 40 | | 21.7 | |
| NUMBER OF RATATIONS OF DRUM IN PAL MODE r.p.m | 4500 | | 1500 | | 9000 | |
| NUMBER OF RATATIONS OF DRUM IN NTSC MODE r.p.m | 4500/1.001 | | 1800/1.001 | | 9000/1.001 | |
| LEAD STILL ANGLE° | 4.885 | | 4.885 | | 9.15 | |
| EFFECTIVE WRAP ANGLE° | 177 | | 180 | | 174 | |
| TRACK PITCH IN PAL MODE μm | 16.34 | 10.9 | 34.4 | 17.2 | 10 | 6.67 |
| TRACK PITCH IN NTSC MODE μm | 16.34 | 10.9 | 20.5 | 10.2 | 10 | 6.67 |

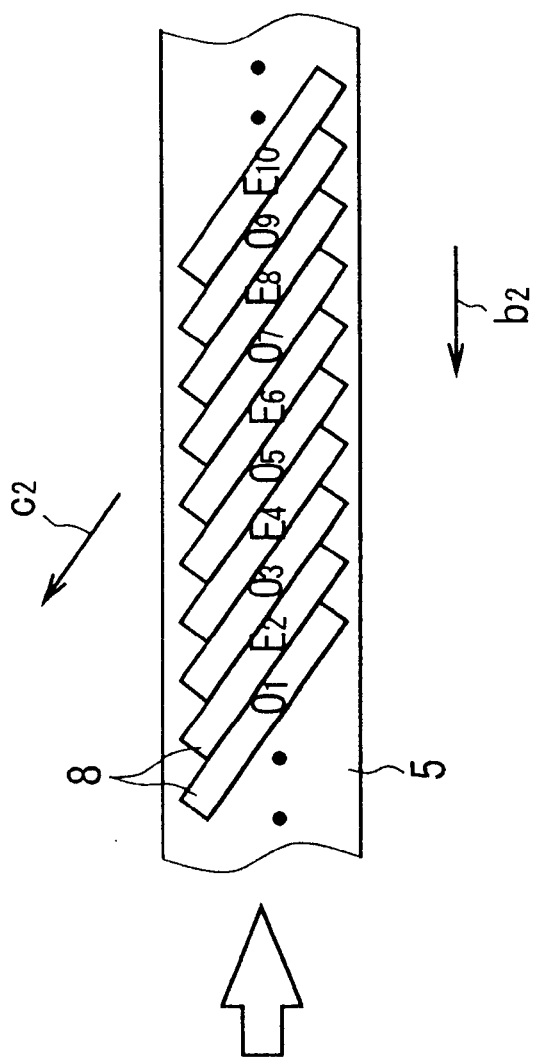
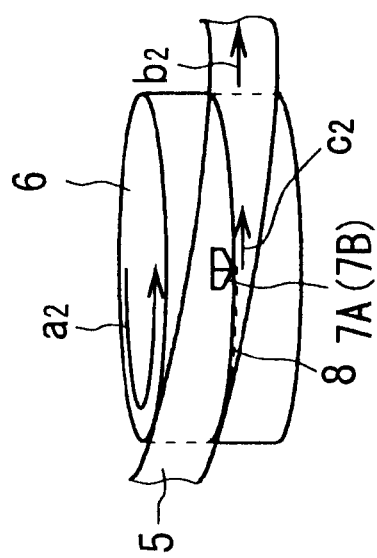
FIG. 2

| ITEM | DIGITAL 8mm SYSTEM | | ANALOG 8mm SYSTEM | | DV SYSTEM | |
|---|---|---|---|---|---|---|
| MODE | SP | LP | SP | LP | SP | LP |
| DIAMETER OF DRUM mm | 40 | | 40 | | 21.7 | |
| NUMBER OF ROTATIONS OF DRUM IN PAL MODE r.p.m | 4500 | | 1500 | | 9000 | |
| NUMBER OF ROTATIONS OF DRUM IN NTSC MODE r.p.m | 4500/1.001 | | 1800/1.001 | | 9000/1.001 | |
| LEAD STILL ANGLE° | 4.885 | | 4.885 | | 9.15 | |
| EFFECTIVE WRAP ANGLE° | 177 | | 180 | | 174 | |
| TRACK PITCH IN PAL MODE μm | 16.34 | 10.9 | 34.4 | 17.2 | 10 | 6.67 |
| TRACK PITCH IN NTSC MODE μm | 16.34 | 10.9 | 20.5 | 10.2 | 10 | 6.67 |

| ITEM | DIGITAL 8mm SYSTEM | | ANALOG 8mm SYSTEM | | DV SYSTEM | |
|---|---|---|---|---|---|---|
| MODE | SP | LP | SP | LP | SP | LP |
| TAPE SPEED IN PAL MODE mm/sec | 14.369 | 9.590 | 20.051 | 10.058 | 9.424 | 6.288 |
| TAPE SPEED IN NTSC MODE mm/sec | f/1.001 | f/1.001 | 14.345 | 7.186 | f/1.001 | f/1.001 |
| fn/2 FREQUENCY MHz | 20.93 | | — | 10.1 | 20.93 | |
| WHITE CLIPPING 220% MHz | | | | | | |
| RELATIVE VELOCITY IN PAL MODE m/sec | 9.41 | 9.42 | 3.12 | 3.13 | 10.22 | 10.22 |
| RELATIVE VELOCITY IN NTSC MODE m/sec | 9.40 | 9.40 | 3.75 | 3.76 | 10.21 | 10.21 |
| SHORTEST WAVELENGTH FOR RECORD IN PAL MODE μm | 0.450 | 0.450 | 0.309 | 0.310 | 0.488 | 0.488 |
| SHORTEST WAVELENGTH FOR RECORD IN NTSC MODE μm | 0.449 | 0.450 | 0.371 | 0.372 | 0.488 | 0.488 |

※ FN INDICATES NYQUIST FREQUENCY

MAGNETIC REPRODUCER AND MAGNETIC REPRODUCTION METHOD

BACKGROUND OF THE INVENTION

1. Field of the Invention

This invention relates to a magnetic reproducer and a magnetic reproduction method, and more particularly, is suitably applied to a video tape recorder incorporated with a camera.

2. Description of the Related Art

Digital video (DV) systems (IEC 61834 helical scan digital video tape cassette recording system using 6.35 mm magnetic tape for consumers (525/60, 625/50, 1125/60 and 1250/50 systems) are utilized as recording systems for digital video tape recorders, and video tape recorders incorporated with cameras and installation type video tape recorders have recently been offered for use with the DV system.

A magnetic tape which is used in the DV system (hereinafter referred to as a DV tape) has a width of 6.35 mm (=¼ inch) which is narrower than a width (8 mm) of a magnetic tape which is used in an analog 8 mm recording system (IEC 60843 helical scan video tape cassette recording system using 8 mm magnetic tape for consumer) (hereinafter referred to as an 8 mm video tape) adopted widely as a recording system for conventional analog video tape recorders.

In spite of this narrow magnetic tape, the DV system has a merit that it is capable recording signals with high qualities and for a long time since it compressed video-audio signals to be recorded and records the signals at a high density.

Though the DV system is not interchangeable with the analog 8 mm system, it is considered that the video-audio signals can be recorded with high qualities and for a long time if video-audio signals in the data format of the DV system can be recorded, for example, on the 8 mm video tape which is wider than the DV tape.

In this case, it is considered that, if such a video tape recorder which performs recording and reproducing can be manufactured, for example, by utilizing production equipment and various kinds of devices for the current analog 8 mm system, a video tape recorder can be composed inexpensively while effectively utilizing resources.

In addition, in this case, it is further considered that, if the video tape recorder can reproduce the video-audio signals recorded on the 8 mm video tape by the analog 8 mm system, without failure, the video tape recorder can have high functional performance as a product.

SUMMARY OF THE INVENTION

In view of the foregoing, an object of this invention is to provide a magnetic reproducer and a magnetic reproduction method which are capable of enhancing the functional performance.

The foregoing object and other objects of the invention have been achieved by the provision of a magnetic reproducer in which a gap width between magnetic heads is set wider than a first track width for a first recording system and is set narrower than a second track width for a second recording system which is wider than that for the first recording system.

As a result, the magnetic reproducer is capable of reproducing information recorded on a magnetic tape in both the first recording system and the second recording system.

Furthermore, the present invention provides a magnetic reproduction method which reproduces information from a magnetic tape using magnetic heads having a gap width which is wider than the first track width for the first recording system and narrower than the second track width for the second recording system which is wider than that for the first recording system.

As a result, the magnetic reproduction method makes it possible to reproduce information which is recorded on the magnetic tape in both the first recording system and the second recording system.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 2 is a schematic diagram explaining a recording format in a relating DV system;

FIGS. 6 and 7 are tables showing specifications of various kinds of recording systems;

DETAILED DESCRIPTION OF THE EMBODIMENT

Preferred embodiments of this invention will be described with reference to the accompanying drawings:

(1) Recording System According to this Invention

A recording system to which the present invention is applied will be described in comparison with the current analog 8 mm system and the conventional DV system. The recording system to which the present invention is applied is a system which records video-audio signals in the data format of the DC system on the 8 mm video tape and is hereinafter referred to as a digital 8 mm system.

Figure 1:
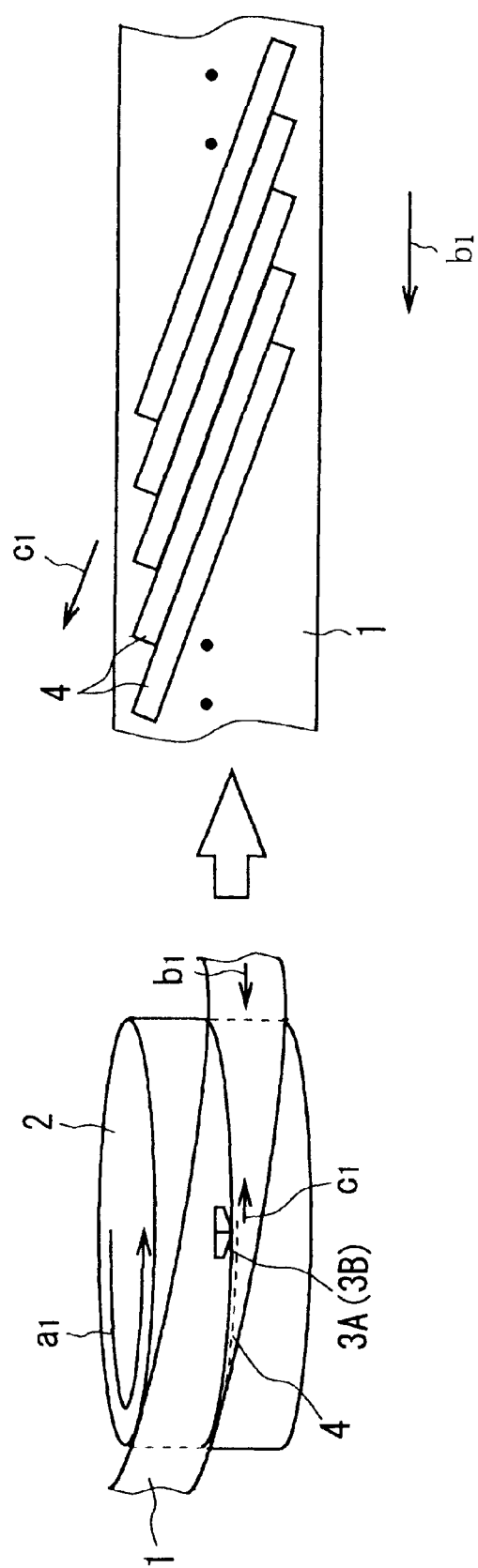
FIG. 1 is a schematic diagram explaining a recording format in an analog 8 mm system.

First, in the analog 8 mm system, the video-audio signals are recorded by rotating (in a direction indicated by an arrow $a_1$,) a rotary drum 2 having a diameter of 40 mm for a video tape 1 at 1800/1.001 r.p.m. in an NTSC mode or 1500 r.p.m. in a phase alternation by line (PAL) mode, as shown in FIG. 1.

In this case, two magnetic heads 3A and 3B which have different azimuth angles are mounted on the rotary drum at locations opposed to each other at an angle of 180°. Accordingly, the two magnetic heads 3A and 3B scan the 8 mm video tape 1 sequentially and alternately at a predetermined angle with respect to a running direction (indicated by an arrow $b_1$,) of the video tape 1, thereby forming tracks 4 sequentially and obliquely along the longitudinal direction of the 8 mm video tape 1 as shown in FIG. 1.

And, in the analog 8 mm system, the video-audio signals are recorded on the 8 mm video tape by forming a single track 4 for a field as described above.

Furthermore, in the DV system, DV data is recorded by rotating (in a direction indicated by an arrow $a_2$) a rotary drum 6 having a diameter of 21.7 mm for a DV tape 5 having a width of 6.35 mm at rotational speed of 9000/1.001 r.p.m. in the NTSC mode or 9000 r.p.m. in the PAL mode as shown in FIG. 2.

In this case also, two magnetic heads 7A and 7B which have different azimuth angles are mounted on the rotary drum 6 at locations opposed to each other at an angle of 180°. Accordingly, the magnetic heads scan sequentially and alternately at a predetermined angle with respect to a running direction of the DV tape, thereby forming tracks 8 sequentially and obliquely along the longitudinal direction, of the DV tape.

In the DV system, it is assumed that the tracks 8 which are formed by the magnetic head 7A are odd tracks $O_1, O_3, \ldots$ and tracks which are formed by the other magnetic head 7B are even tracks $E_2, E_4, \ldots$, the video-audio signals for one frame are divided and recorded on a total of ten tracks 8 of five odd tracks $O_1, O_3, \ldots$ and five even tracks $E_2, E_4, \ldots$ in the NTSC mode or on a total of twelve tracks 8 of six odd tracks $O_1, O_3, \ldots$ and six even tracks $E_2, E_4, \ldots$ in the PAL mode.

Figure 3:
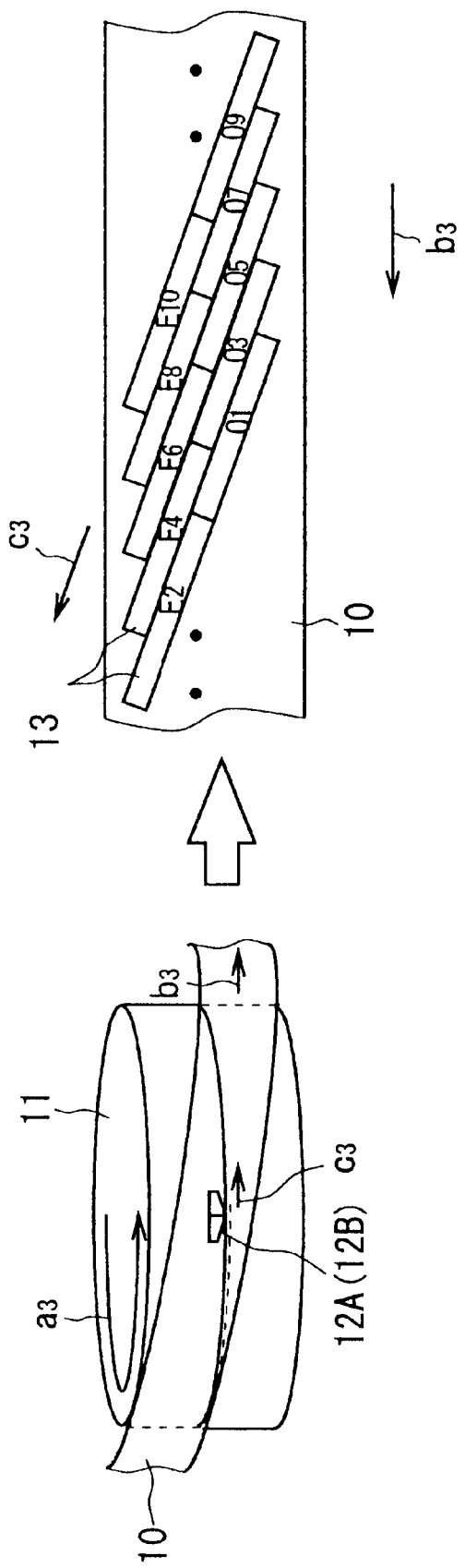
FIG. 3 is a schematic diagram explaining a digital 8 mm system.

On the other hand, in the digital 8 mm system to which the present invention is applied, the video-audio signals in the DV data format of the DV system are recorded by rotating (in a direction indicated by an arrow $a_3$) a rotary drum 11 having a diameter which is the same as that of the analog 8 mm system (40 mm) for an 8 mm video tape 10 at 4500/1.001 r.p.m. in the NTSC mode or at 4500 r.p.m. in the PAL mode, as shown in FIG. 3.

In this case, two magnetic heads 12A and 12b which have different azimuth angles are mounted on the rotary drum 11 at locations opposed to each other at an angle of 180°. Accordingly, the two magnetic heads 12A and 12B scan sequentially and alternately at a predetermined angle with respect to a running direction (indicated by an arrow $b_3$) of the 8 mm video tape 10, thereby forming sequentially and obliquely tracks 13 along the longitudinal direction of the 8 mm video tape 10 as shown in FIG. 3.

In the digital 8 mm system, data for two tracks in the DV system are continuously recorded on a single track 13 of the 8 mm video tape without changing a data pattern of the DV system. That is, in the digital 8 mm system, data on the odd tracks $O_1, O_3, \ldots$ and data on the even tracks $E_2, E_4, \ldots$ of the DV system are regarded as pairs to be recorded on a single track 13 without changing contents of the data.

For example, in the digital 8 mm system, data on the odd track $O_1$ and data on the even track $E_2$ in the DV system are regarded as a pair to be continuously recorded on a single track 13. Then, data on the odd track $O_3$ and data on the even track $E_4$ are regarded as a pair to be continuously recorded on a next track 13. Thereafter, similarly, data on two successive tracks 8 (FIG. 2) in the DV system are regarded as a pair to be continuously recorded on a single track 13.

Accordingly, in the digital 8 mm system, the video-audio signals for one frame are divided to be recorded on five tracks 13 of the 8 mm video tape 10 in the NTSC mode or on six tracks 13 in the PAL mode.

Figure 4:
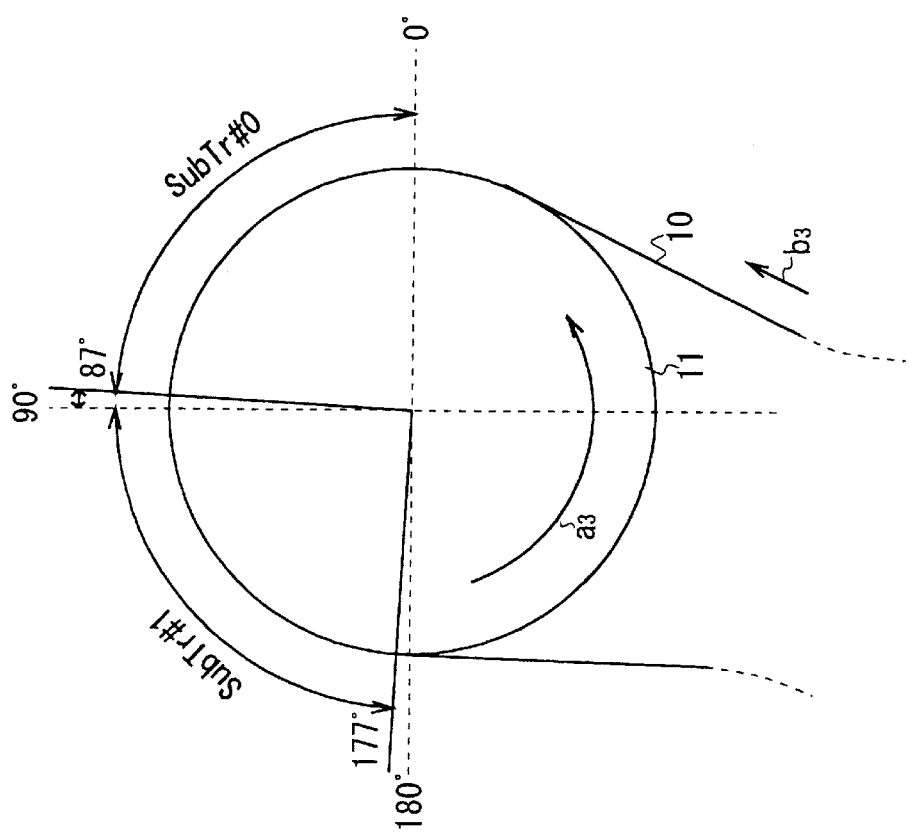
FIGS. 4 and 5 are schematic diagrams concretely explaining the digital 8 mm system.
Figure 5:
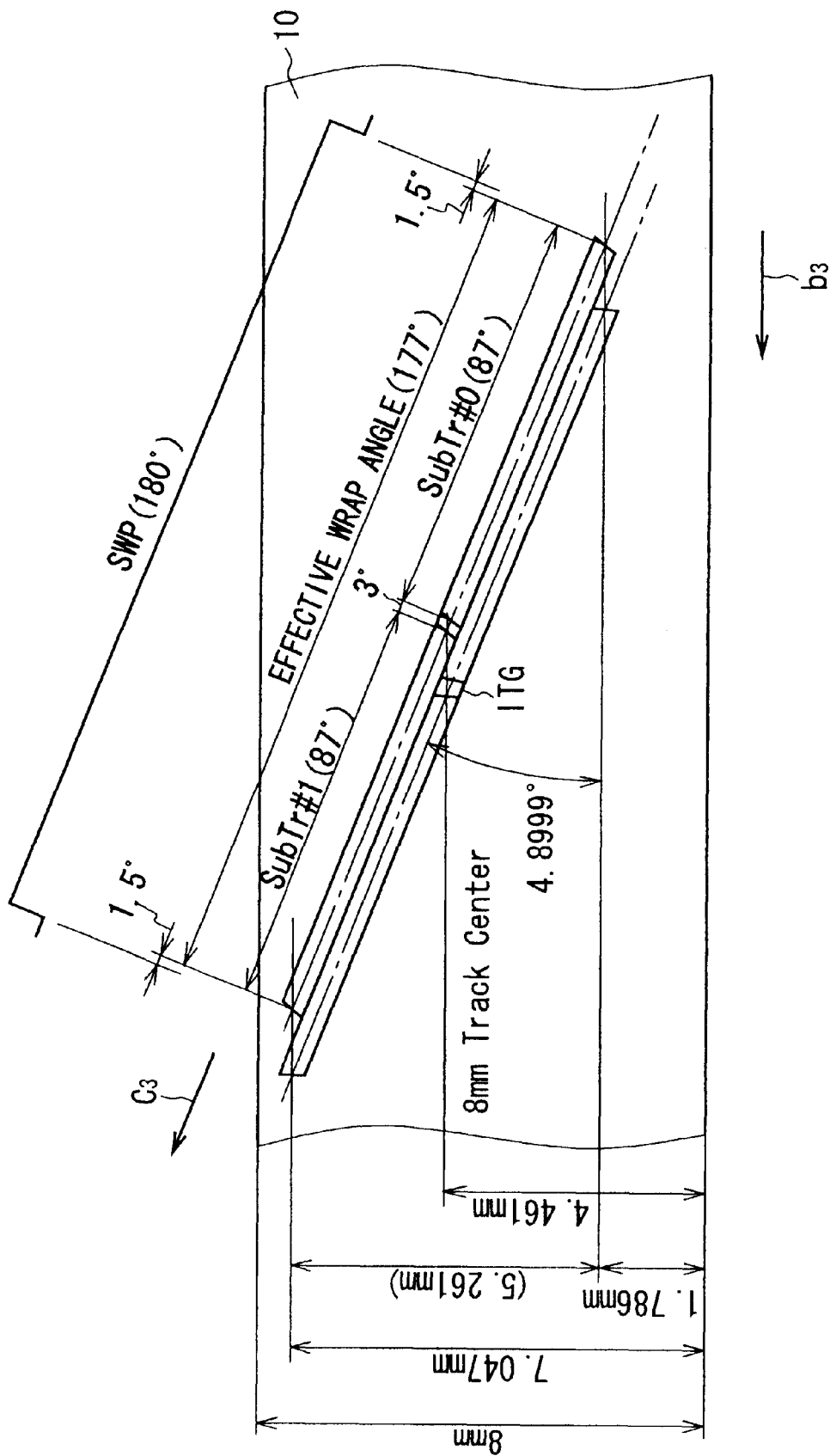

FIGS. 4 and 5 show a concrete recording format of the digital 8 mm system.

As apparent from FIGS. 4 and 5, an effective wrap angle of 177° is selected in the digital 8 mm system. Within this effective wrap angle, two subtracks SubTr #0 and SubTr #1 are disposed with a gap inter track gap (ITG) of 3° interposed.

Each of the subtracks SubTr #0 and SubTr #1 is set within a winding angle of 87° with respect to the rotary drum 11, and data for one track in the DV system is recorded without changing the data format of the DV system. As a result, data on the odd tracks $O_1, O_3, \ldots$ and data on the even tracks $E_2$, $E_4, \ldots$ of the DV system are successively recorded track by track as they are within the effective wrap angle.

Furthermore, in the digital 8 mm system, the two magnetic heads mounted on the rotary drum 11 are switched with a switching pulse SWP which is generated in synchronization with a rotational phase of the rotary drum 11.

That is, the switching pulse SWP is changed over when the magnetic head 12A (Ach, for example) completes recording of the data within the effective wrap angle, and then the other magnetic head 12B (Bch, for example) starts recording the data within the effective wrap angle. Incidentally, the switching pulse SWP is changed over each time when the rotary drum rotates by 180°. Accordingly, a margin of 1.5° is produced at a preceding stage of the effective wrap angle.

By the way, specifications of the digital 8 mm system to which the present invention is applied are listed in FIGS. 6 and 7 by corresponding to the NTSC mode with the PAL mode. Specifications of the analog 8 mm system and the conventional DV systems are also listed for comparison.

In the digital 8 mm system, data for the two tracks in the DV system is continuously recorded on the 8 mm video tape 10 as one track without changing the data pattern as described above, so that a tape area can be utilized effectively and further, images can be recorded and reproduced with high qualities for a long time.

(2) Configuration of Magnetic Heads according to this Invention Now, gap widths of the magnetic heads 12A and 12B will be considered, which are capable of recording/reproducing the video-audio signals in the data format of the DV system for 60 minutes on/from the 8 mm video tape 10 for 120 minutes by such a digital 8 mm system and further, of reproducing the video-audio signals of the analog 8 mm system which are recorded on the 8 mm video tape 10.

Figure 8:
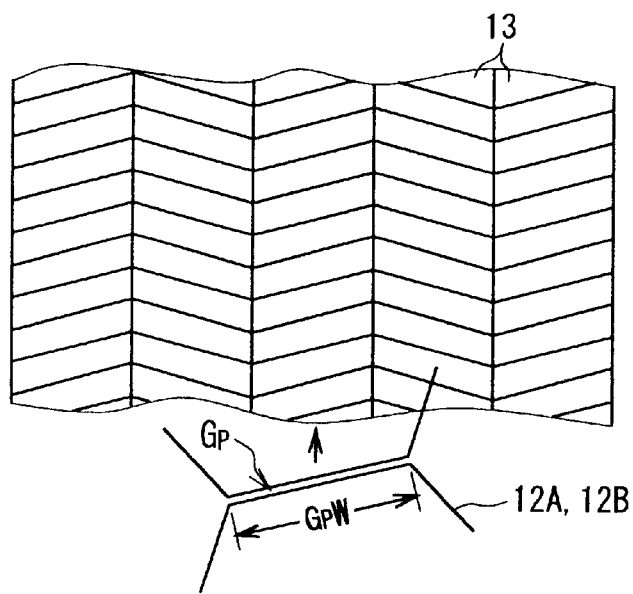
FIG. 8 is a schematic diagram explaining a gap width between magnetic heads.

In the following explanation, a width of portions which have the same gap intervals in gaps Gp of the magnetic heads 12A and 12B is referred to as a gap width GpW, as shown in FIG. 8. And the case of the standard NTSC mode will be especially explained below.

In the analog 8 mm system, in the case of the standard NTSC mode (SP mode), the video-audio signals are recorded on the 8 mm video tape 1 (FIG. 1) by sequentially forming a single track 4 for each field (FIG. 1) at a track pitch of 20.5 μm. Accordingly, 60 tracks 4 are formed for one second on the 8 mm video tape 1 in the standard NTSC mode.

In contrast, in the DV system, the video-audio signals for a frame are divided and recorded onto 10 tracks 8 (FIG. 2), and therefore 300 tracks are formed for a second on the DV tape 5 (FIG. 2) for the video-audio signals in the NTSC mode. Accordingly, in the digital 8 mm system, half a number of tracks in the DV system, 150 tracks 13 (FIG. 3), are formed for one second on the 8 mm video tape 10 (FIG. 3).

For recording the video-audio signals for 120 minutes on the 8 mm video tape by the analog 8 mm system, a length L of the video tape is obtained by the following equation (1):

$$L = \text{(track pitch)} \times \text{(number of tracks)} \times \text{(recording time)} \quad (1)$$

$$= 20.5 \times 60 \times (2 \times 60 \times 60)$$

Therefore, in case of recording the video-audio signals on the video tape having the length L by the digital 8 mm system, it is assumed that the track pitch on the 8 mm video tape is TWP, and a track pitch TWp may be selected so as to satisfy the following equation (2):

$$20.5 \times 60 \times (2 \times 60 \times 60) = TW_p \times 150 \times (1 \times 60 \times 60) \ldots \quad (2)$$

In this case, the track pitch TWp is 16.4 μp. However, under various conditions, an ideal track pitch in this case is 16.34 μm.

Accordingly, when only recording and reproduction by the digital 8 mm system are taken into consideration, it is desirable that the magnetic heads 12A and 12B have a gap width GpW of 16.34 μm which is the same as the track pitch GpW of the digital 8 mm system.

If a gap width between magnetic heads is narrower than a track width (corresponding to a track pitch) on each magnetic tape, a reproduction output from the magnetic head generally deteriorates. Accordingly, selecting, for example, 16.34 μm as the gap width GpW of the magnetic heads 12A and 12B causes a problem that a sufficient reproduction output cannot be obtained at a stage to reproduce the video-audio signals recorded by the analog 8 mm system (having a track pitch of 20.5 [μm]).

On the other hand, in the case where only reproduction by the analog 8 mm system is taken into consideration, it is desirable that the gap width GpW of the magnetic heads 12A and 12B is on the order of 20.5 μm which is the same as the track pitch of the analog 8 mm system.

However, when a gap width between magnetic heads is wider than a track width of each track on a magnetic tape, crosstalk from an adjacent track is generally remarkable, thereby lowering a C/N ratio (enhancing an error rate). Therefore, selecting 20.5 μm as the gap width between the magnetic heads 12A and 12B causes a problem that crosstalk from an adjacent track 13 is remarkable at a stage to reproduce the video-audio signals recorded by the digital 8 mm system, thereby it is difficult to obtain a sufficient C/N ratio.

Figure 9:
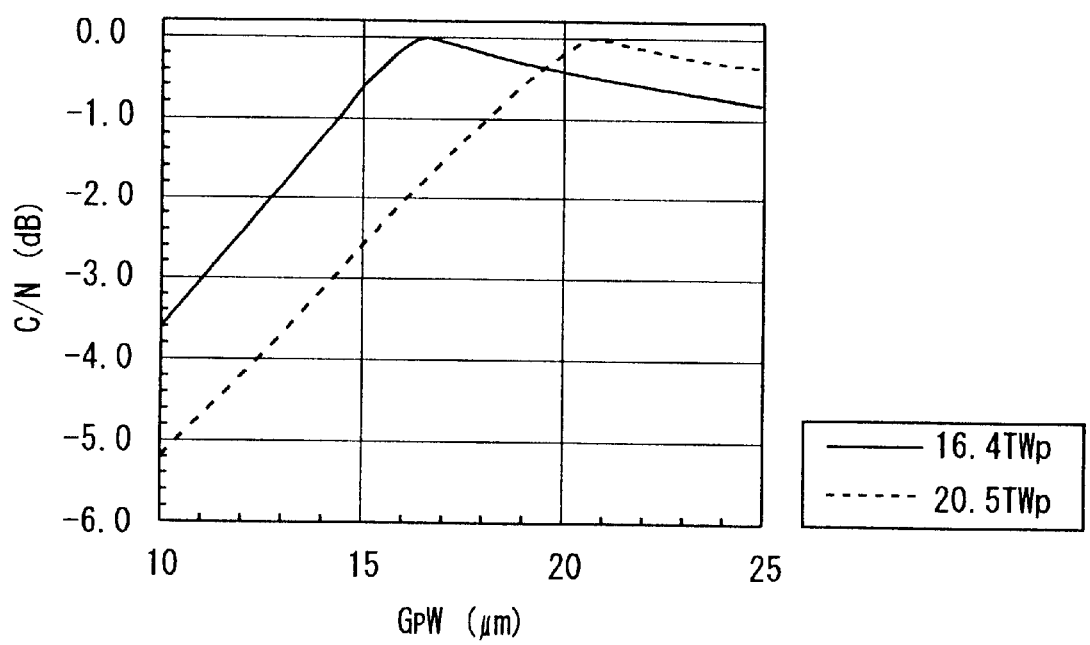
FIG. 9 is a characteristic curve showing relationship between the gap width between the magnetic heads and a C/N ratio.

Here, when the gap width GpW of the magnetic heads 12A and 12B is varied in the analog 8 mm system and the digital 8 mm system, the respective C/N ratios varies as shown in FIG. 9. FIG. 9 shows results of simulations which were carried out on assumptions for both the digital 8 mm system and the analog 8 mm system that the C/N ratio is at 0 [dB] when the gap width GpW of the magnetic heads 12A and 12B is equal to the track pitch, that only an output (C) lowers at constant noise (N) when the gap width GpW of the magnetic heads 12A and 12B is narrower than the track pitch, and that only the noise (N) increases at the constant output (C) when the gap width GpW of the magnetic heads 12A and 12B is wider than the track pitch. In FIG. 9, a solid line and a broken line indicate C/N ratios at track pitches of 16.4 μm and 20.5 μm, respectively.

As apparent from FIG. 9, in both the analog 8 mm system and the digital 8 mm system, the C/N ratio is a maximum value when the gap width GpW of the magnetic heads 12A and 12B is slightly wider than a track pitch on a track to be played back, and gradually lowers as the gap width GpW is wider or narrower than the track width. Further, with the gap width Gpw at the maximum value of the C/N ratio as a standard, the C/N ratio lowers at a higher rate when the gap width GpW is made narrower as compared with a rate when the gap width GpW is made wider.

Taking into consideration the simulation results shown in FIG, 9 and a fact that error correction processing is possible for the digital recording reproduction, it will be understood that a high C/N ratio can be obtained for both the analog 8 mm system and the digital 8 mm system by selecting as the gap width GpW of the magnetic heads 12A and 12B a value which is close to the gap width GpW (=20.5 μm) which leads to a maximum C/N ratio in the analog 8 mm system so that the video-audio signals are recorded/reproduced on/from the 8 mm video tape by the digital 8 mm system, and also the video-audio signals of the analog 8 mm system recorded on the 8 mm video tape are reproduced enough to use in practice.

Accordingly, the gap width GpW of 19 to 20 μm is selected for the gap width between the magnetic heads 12A and 12B in the embodiment of the present invention. This gap width makes it possible to obtain a sufficient reproduction output at a stage to reproduce the video-audio signals recorded by the analog 8 mm system and a practically sufficient C/N ratio at a stage to reproduce the video-audio signals recorded by the digital 8 mm system.

(3) Configuration of Video Tape Recorder according to this Invention

Figure 10:
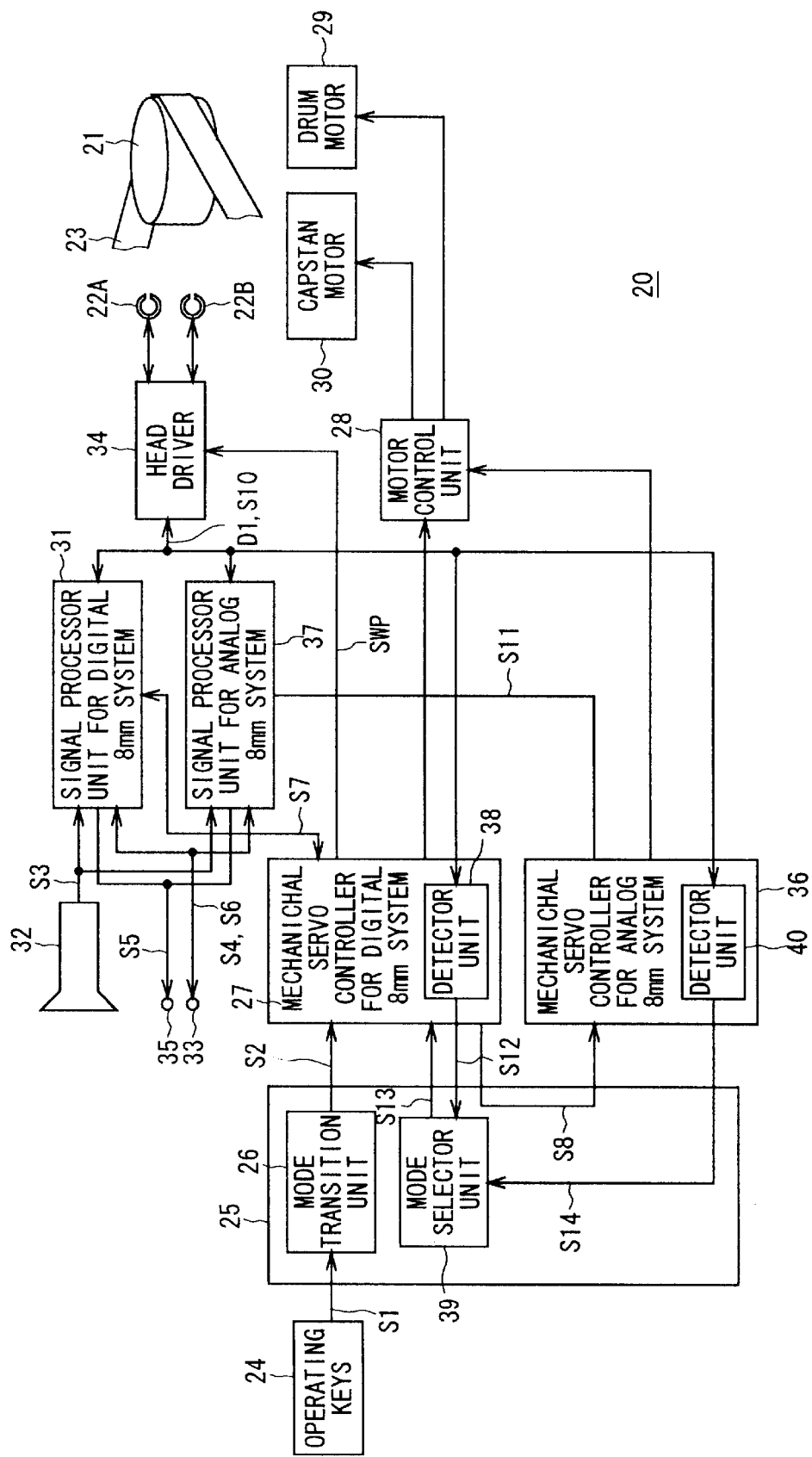
FIG. 10 is a block diagram showing a configuration of a video tape recorder according to an embodiment.

FIG. 10 shows a video tape recorder 20 incorporated with a camera to which the present invention is applied. In a video tape recorder 20, two magnetic heads 22A and 22B having a gap width of 19 to 20 μm and different azimuth angles are mounted on a rotary drum 21 at locations opposed to each other at an angle of 180°. And, video-audio signals can be recorded/reproduced on/from the 8 mm video tape 23 by the digital 8 mm system with the two magnetic heads 22A and 22B, and also video-audio signals recorded on the 8 mm video tape 23 by the analog 8 mm system can be reproduced.

The video tape recorder 20 is actually equipped with operating key 24 for selecting operation modes at a predetermined position so as to select one operation mode from the recording mode and the reproduction mode of the digital 8 mm system and the reproduction mode of the analog 8 mm system with the operating key 24.

When one operation mode is selected in the video tape recorder 20 by manipulating the operating key 24, a mode selection signal S1 corresponding to the selected operation mode is given as an operation mode designation signal S2 to a mechanical servo controller for the digital 8 mm system 27 via a mode transition unit 26 of a control unit 25.

When the recording mode of the digital 8 mm system is designed, for example, the mechanical servo controller for the digital 8 mm system 27 controls a drum motor 29 and a capstan motor 30 via a motor control unit 28 on the basis of the supplied operation mode designation signal S2, thereby rotating the rotary drum 21 at 4500/1.001 r.p.m. in the NTSC mode or 4500 r.p.m. in the PAL mode and running the 8 mm video tape 23 loaded on the rotary drum 21 at a travelling speed of 14.348/1.001 mm/sec in the standard NTSC mode, 9.590/1.001 mm/sec in a long play (LP) NTSC mode, 14.348 mm/sec in a standard PAL mode or 9.590 mm/sec in a long play PAL mode.

Furthermore, the mechanical servo controller for the digital 8 mm system 27 controls a signal processor unit for the digital 8 mm system 31 together with the above controls. At this time, to the signal processor unit for the digital 8 mm system 31, an image pickup signal S3 having an analog waveform is given from an image pickup unit 32 which is composed of a lens system, a charge coupled device (CCD) and the like, and also an audio signal S4 having an analog waveform is given from a microphone (not shown) via an audio input/output terminal 33.

Therefore, under the control of the mechanical servo controller for the digital 8 mm system 27, the signal processor unit for the digital 8 mm system 31 sequentially performs predetermined signal processing based on the DV system, such as an analog/digital conversion processing, a coding processing, an error correction processing, an automatic track finding (ATF) signal overlapping processing and a modulation processing, on the supplied image pickup signal S3 and audio signal S4, and sends out the obtained video and audio data (hereinafter referred to as DV data) D1 in the data format of the DV system to a head driver 34.

On the basis of the switching pulse SWP which is given from the mechanical servo controller for the digital 8 mm system 27 at this time, while sequentially and alternately switching the magnetic heads 22A and 22B, the head driver 34 sends out the supplied DV data D1 amount by amount equivalent to two tracks of the DV system, to the magnetic head 22A or 22B running on the 8 mm video tape 23.

As a result, the DV data D1 is sequentially recorded, amount by amount equivalent to the two tracks of the DV system as a single continuous track, on the 8 mm video tape 23 by using the magnetic heads 22A and 22B.

In this way, the video tape recorder 20 is capable of recording the image pickup signal S1 output from the image pickup unit 32 and the audio signal S4 output from the microphone on the 8 mm video tape 23 by the digital 8 mm system which was described above with reference to FIG. 3.

On the other hand, when the reproduction mode of the digital 8 mm system is designated, for example, the mechanical servo controller for digital 8 mm system 27 controls the drum motor 29 and the capstan motor 30 on the basis of the operation designation signal S2 via the motor control unit 28, thereby rotating the rotary drum 21 at the same speed as the recording mode of the digital 8 mm system described above and running the 8 mm video tape 23 at the same speed as the recording mode of the digital 8 mm system.

As a result, the DV data D1 for an amount equivalent to one track on the 8 mm video tape (for an amount equivalent to two tracks in the DV system) is sequentially reproduced by using the magnetic heads 22A and 22B mounted on the rotary drum 21 each time when the rotary drum 21 makes a rotation, and given to the signal processor unit for the digital 8 mm system 31 via the head driver 34.

Under the control of the mechanical servo controller 27, the signal processor unit for the digital 8 mm system 31 performs predetermined signal processing according to the DV system such as demodulation processing, error correction processing, decoding processing and digital/analog conversion processing, on the DV data D1, sends an obtained video signal outside as a reproduction video signal S5 via an image input/output terminal 35, and also sends an obtained audio signal outside as a reproduction audio signal S6 via an audio input/output terminal 34.

In addition, at this time, the signal processor unit for the digital 8 mm system 31 divides and extracts an ATF signal S7 which has been superimposed on the DV data D1 and sends it out to the mechanical servo controller for the digital 8 mm system 27. On the basis of the ATF signal S7, the mechanical servo controller for the digital 8 mm system 27 controls a rotation speed of the capstan motor 30 via the motor control unit 28. for tracking control.

In this way, the video tape recorder 20 is capable of reproducing and outputting the DV data recorded on the 8 mm video tape 23 by the digital 8 mm system described above with reference to FIG. 3, in the reproduction mode of the digital 8 mm system.

In the case where the reproduction mode of the analog 8 mm system is designated, for example on the other hand, the mechanical servo controller for the digital 8 mm system 27 sends out, on the basis of the operation mode designation signal S2, a mode transition signal S8 to a mechanical servo controller for the analog 8 mm system to 36 inform the operation mode via the control unit 25.

At this time, the mechanical servo controller 36 controls the drum motor 29 and the capstan motor 30 via the motor control unit 28 on the basis of the mode transition signal S8, thereby rotating the rotary drum 21 at a rotating speed of 1800/1.001 r.p.m. in the NTSC mode or of 1500 r.p.m. in the PAL mode and running the 8 mm video tape 23 at a travelling speed of 14.354 mm/sec in the standard NTSC mode, 7.186 mm/sec in the long play NTSC mode, 20.051 mm/sec in the standard PAL mode or 10.058 mm/sec in the long play PAL mode.

As a result, a video-audio signal S10 recorded on the 8 mm video tape 23 by the analog 8 mm system is reproduced track by track by using one magnetic head 22A, 22B each time when the rotary drum makes a rotation, and given to a signal processor unit for the analog 8 mm system 37 via the head driver 34.

At this time, the signal processor unit for the analog 8 mm system 37 performs predetermined signal processing of the supplied video-audio signal S10 corresponding to the analog 8 mm system under the control of the mechanical servo controller for the analog 8 mm system 36, outputs a video signal having an analog waveform obtained as the reproduction video signal S5 outside via the image input/output terminal 35 and outputs an audio signal having an analog waveform obtained as the reproduction audio signal S6 outside via the audio input/output terminal 33.

At this time, the signal processor unit for the analog 8 mm system 37 further divides and extracts an ATF signal S11 which is superimposed on the video-audio signal S10, and sends the ATF signal to the mechanical servo controller for the analog 8 mm system 36. On the basis of the AFT signal S11, the mechanical servo controller for the analog 8 mm system 36 controls the capstan motor 30 by way of the motor control unit 28 for tracking control.

In this way, the video tape recorder 20 is capable of reproducing and outputting outside, in the reproduction mode of the analog 8 mm system, the video-audio signal recorded on the 8 mm video tape 23 by the analog 8 mm system.

In this video tape recorder 20, an output from the head driver 34 is given to an analog 8 mm signal detector unit 38 of the mechanical servo controller for the digital 8 mm system 27 in the reproduction mode of the digital 8 mm system.

The analog 8 mm signal detector unit 38 always monitors the output from the head driver 34, and when a signal in the analog 8 mm system (that is, the video-audio signal S10) is detected, the analog 8 mm signal detector unit 38 sends out to a mode selector unit 39 of the control unit 25 an analog 8 mm detection signal S12 which informs the detection of the video-audio signal S10. Upon reception of the analog 8 mm detection signal S12, the mode selector unit 39 sends out a mode selection signal S13 corresponding to the analog 8 mm detection signal S12 to the mechanical servo controller for the digital 8 mm system 27.

In addition, upon reception of the mode selection signal S13, the mechanical servo controller for the digital 8 mm system 27 stops a signal processing operation of the signal processor unit for the digital 8 mm system 31, stops control of the drum motor 29 and the capstan motor 30 via the motor control unit 28, and sends out the mode transition signal S8 to the mechanical servo controller for the analog 8 mm system 36 via the control unit 25.

The mechanical servo controller for the analog 8 mm system 36, on the basis of the supplied mode transition signal S8, controls the drum motor 29 and the capstan motor 30 via the motor control unit 28 to rotate these motors as in the reproduction mode of the analog 8 mm system described above, and further, controls the signal processor unit for the analog 8 mm system 37 to start signal processing as in the reproduction mode of the analog 8 mm system described above.

In this way, when the signal of the analog 8 mm system is reproduced in the reproduction mode of the digital 8 mm system, the video tape recorder 20 switches the operation mode to the reproduction mode of the analog 8 mm system as described above.

Similarly, the video tape recorder 20 gives the output from the head driver 34 to a digital 8 mm signal detector unit 40 of the mechanical servo controller for the analog 8 mm system 36 in the reproduction mode of the analog 8 mm system.

In this case, the digital 8 mm signal detector unit 40 always monitors the output from the head driver 34, and when detecting a signal of the digital 8 mm system (that is, the DV data D1), sends out a digital 8 mm detection signal S14 to the mode selector unit 39 of the control unit 25. Upon receiving the digital 8 mm detection signal S14, the mode selector unit 39 sends out the mode selection signal S13 corresponding to the digital 8 mm detection signal S14 to the mechanical servo controller for the digital 8 mm system 27.

Upon reception of the mode selection signal S13, the mechanical servo controller for the digital 8 mm system 27 sends out the mode transition signal S8 to the mechanical servo controller for the analog 8 mm system 36 via the control unit 25.

As a result, on the basis of the mode transition signal S13, the mechanical servo controller for the analog 8 mm system 36 controls the signal processor unit for the analog 8 mm system 37 to stop the signal processing operation, and stops the control of the drum motor 29 and the capstan motor 30 via the motor control unit 28.

At this-time, the mechanical servo controller for the digital 8 mm system 27 controls the drum motor 29 and the capstan motor 30 via the motor control unit 28 to rotate these motors as in the reproduction mode by the digital 8 mm system described above, and controls the signal processor unit for the digital 8 mm system 31 to start the signal processing operation as in the reproduction mode of the digital 8 mm system.

In this way, the video tape recorder 20 switches the operation mode to the reproduction mode of the digital 8 mm system when the signal of the digital 8 mm system is reproduced in the reproduction mode by the analog 8 mm system.

(3) Operations and Effects of the Embodiment

In the aforementioned configuration, in the recording mode or the reproduction mode of the digital 8 mm system, the video tape recorder 20 records or reproduces the DV data D1 of the data format for the DV system sequentially track by track (amount by amount corresponding to the two tracks of the DV system) on or from the 8 mm video tape 23 by alternately using the magnetic heads 22A and 22B mounted on the rotary drum 21.

In the reproduction mode of the analog 8 mm system, the video tape recorder 20 reproduces the video-audio signal S10 of the analog 8 mm system sequentially track by track (that is, field by field) by alternately using the magnetic heads 22A and 22B.

Accordingly, the video tape recorder 20 is capable of continuously recording data for two tracks of the DV system on a track of an 8 mm video tape which is wider than the DV tape, thereby making it possible to effectively utilize a tape area, and to record video-audio signals with high qualities for a long time.

Further, in this case, since the video tape recorder 20 uses the magnetic heads 22A and 22B which have gap width of 19 to 20 $\mu$m, it is capable of providing a sufficient reproduction output at a stage to reproduce the video-audio signal S10 which is recorded on the 8 mm video tape by the analog 8 mm system and also providing a C/N ration sufficient for practical use at a stage to reproduce the DC data D1 which is recorded by the digital 8 mm system.

In the aforementioned configuration, the gap width between the magnetic heads 22A and 22B is set at 10 to 20 $\mu$m, so that it is possible to efficiently reproduce both the DV data D1 and the video-audio signal S10 which are recorded on the 8 mm video tape 23 by the digital 8 mm system, and thereby providing a video tape recorder which is capable of recording and reproducing images and voices with high qualities for a long time.

(4) Other Embodiments

In the aforementioned embodiment, the present invention is applied to the video tape recorder 20 incorporated with a camera which is capable of reproducing signals recorded by the analog 8 mm system and the digital 8 mm system. However, the present invention is not limited thereto and is widely applicable to various kinds of magnetic reproducers which reproduces information recorded on a magnetic tape, by scanning tracks which are formed sequentially and obliquely on the magnetic tape and which have a first track width corresponding to a first recording system or a second track width corresponding to a second recording system which is wider than that for the first recording system.

In this case, in the aforementioned embodiment, information recorded on a magnetic tape is the video-audio signal (DV data D1 and video-audio signal S10). However, the present invention is not limited thereto and the information can be information other than the video-audio information signal recorded on the magnetic tape.

Further, in the aforementioned configuration, the gap width between the magnetic heads 22A and 22B is set at 19 to 20 $\mu$m on the basis of the simulation results. However, the present invention is not limited thereto and the gap width between the magnetic heads 22A and 22B can be set at 17.0 to 20.0, taking into consideration, for example, performance of the magnetic heads 22A and 22B, an influence due to side erase, and a scanning linearity. In short, other various values can be set as the gap width between the magnetic heads 22A and 22B so far as the gap width between the magnetic heads 22A and 22B is set at a value which is narrower than the track width (20.5 $\mu$m) for the analog 8 mm system and is wider than the track width (16.34 $\mu$m) for the digital 8 mm system.

As described above, according to the present invention, a magnetic reproducer uses magnetic heads having a gap width which is wider than a first track width for a first recording system and is narrower than a second track width for a second recording system which is wider than that for the first recording system, thereby being capable of reproducing data recorded on a magnetic tape in both the first recording system and the second recording system and having enhanced functional performance.

Furthermore, according to the present invention, in a magnetic reproduction method, information is reproduced from the magnetic tape using the magnetic heads having a gap width which is wider than the track width for the first recording system and is narrower than the track width for the second recording system which is wider than that for the first recording system, thereby being capable of reproducing information recorded on the magnetic tape in both the first recording system and the second recording system and enhancing functional performance.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A magnetic reproducer for reproducing data recorded on a magnetic tape by forming tracks sequentially and obliquely along a longitudinal direction of said magnetic tape, comprising magnetic heads for reproducing said information by sequentially scanning said tracks formed on said magnetic tape with a first track width for a first recording system or a second track width for a second recording system wider than that for said first recording system, wherein a gap width between said magnetic heads is set at a value which is wider than said first track width and narrower than said second track width.

2. The magnetic reproducer according to claim 1, wherein:

said first recording system is a recording system in which said information is recorded as a digital signal on said magnetic tape;

said second recording system is a recording system in which said information is recorded as an analog signal on said magnetic tape; and said gap width between said magnetic heads is set at a close value to said second track width for said second recording system rather than said first track width for said first recording system.

3. The magnetic reproducer according to claim 1, wherein said first recording system is a recording system in which said information for at least two tracks in a data format for a predetermined digital recording system is continuously recorded on one track of said magnetic tape corresponding to said second recording system which is wider than a tape width corresponding to said first recording system; and said second recording system is a recording system in which said information is recorded as an analog signal on said magnetic tape.

4. The magnetic reproducer according to claim 3, wherein:

said first track width is 16.34 $\mu$m;

said second track width is 20.5 $\mu$m; and said gap width between said magnetic heads is set within a range from 17.0 to 20.0 $\mu$m.

5. A magnetic reproduction method of reproducing information recorded on a magnetic tape by forming tracks sequentially and obliquely along a longitudinal direction of a magnetic tape, comprising:

a first step of reproducing said information by sequentially scanning said tracks formed on said magnetic tape with a first track width for a first recording system or with a second track width for a second recording system which is wider than that for said first recording system while running said magnetic tape at a predetermined speed; and a second step for performing predetermined signal processing on said information reproduced from said magnetic tape, wherein said information is reproduced from said magnetic tape using said magnetic heads having a gap widths wider than said first track width and narrower than said second track width.

6. The magnetic reproduction method according to claim 5, wherein:

said first recording system is a recording system in which said information is recorded as a digital signal on said magnetic tape;

said second recording system is a recording system in which said information is recorded as an analog signal on said magnetic tape; and said gap width between said magnetic heads is set at a value which is close to said second track width for said second recording system rather than said first track width for said first recording system.

7. The magnetic reproduction method according to claim 5, wherein:

said recording system is a recording system in which said information for at least two tracks in a data format for a predetermined digital recording system is continuously recorded on one track of said magnetic tape corresponding to said second recording system which is wider than a tape width corresponding to said first recording system; and said second recording system in a recording system in which said information is recorded as an analog signal on said magnetic tape.

8. The magnetic reproduction method according to claim 7, wherein:

said first track width is approximately 16.34 $\mu$m;

said second track width is 20.5 $\mu$m; and said gap width between said magnetic heads is set within a range from 17.0 to 20.0 $\mu$m.

* * * * *